Nov. 7, 1933.                R. E. RAMSAY                1,934,276
                          ICE CREAM FREEZER
                    Filed Feb. 10, 1932         2 Sheets-Sheet 1
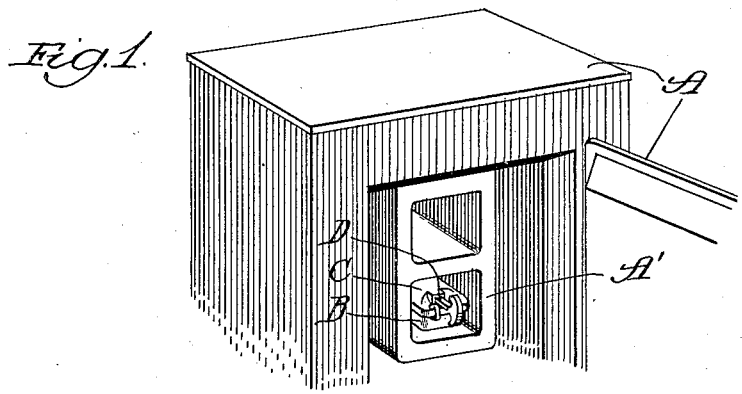
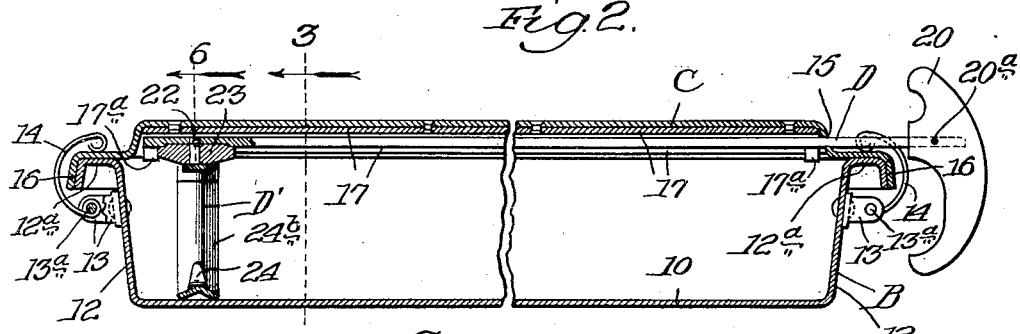
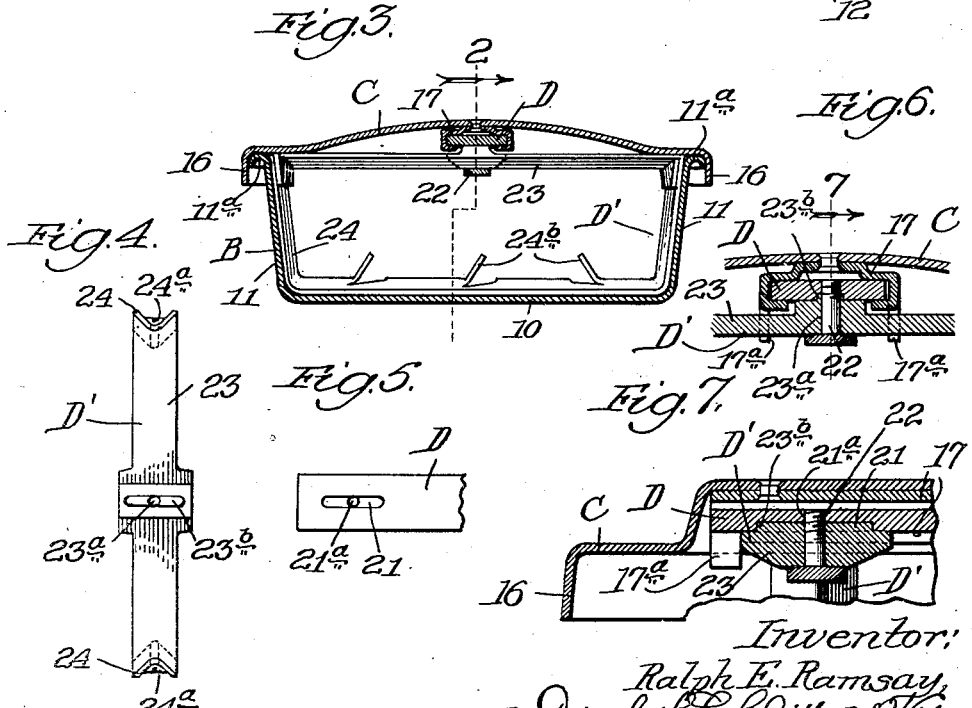
Inventor:
Ralph E. Ramsay,
By Dyrenforth, Lee, Chritton & Wiles,
Attys.

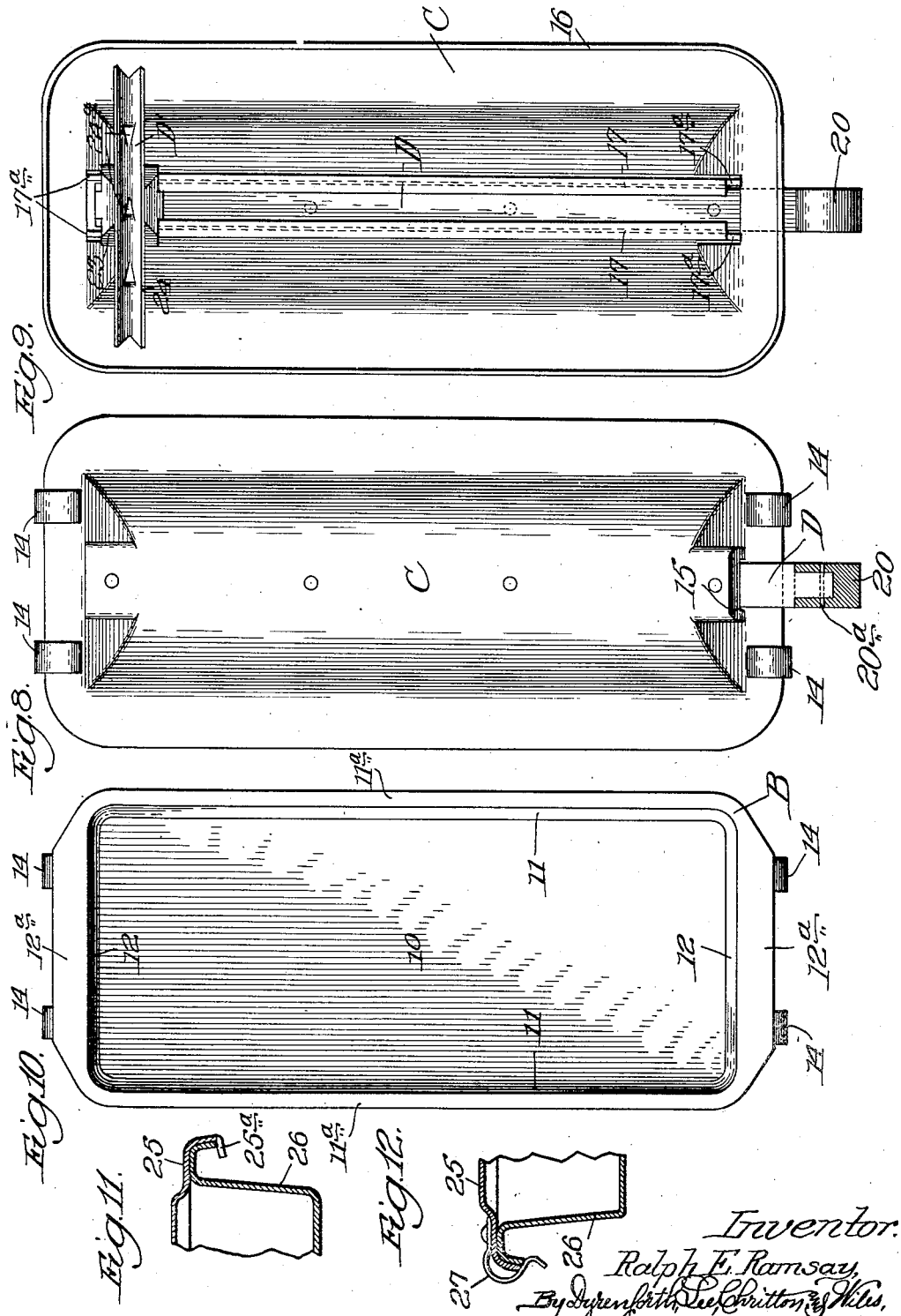

Patented Nov. 7, 1933

1,934,276

UNITED STATES PATENT OFFICE 1,934,276

ICE CREAM FREEZER

Ralph E. Ramsay, Madison, Wis., assignor to French Battery Company, a corporation of Wisconsin Application February 10, 1932. Serial No. 592,133

1 Claim. (Cl. 259—113)

This invention relates particularly to devices for making frozen confections, such as ice cream, and more particularly to improved means for agitating the ingredients of the confection during the freezing operation.

The primary object of the invention is to provide a simple inexpensive device of the above character, which can be inserted in the place of the ordinary ice-cube tray which is generally provided in standard mechanical refrigerators of the household type.

It has been found that when the ingredients of such confections are not stirred or otherwise agitated at frequent intervals during the freezing operation, the food becomes needle-like in texture. It has been found that the most effective way to overcome this fault is to scrape frequently the sidewalls and bottom-wall of the tray, which is the place where the crystals first begin to form. Such action will result in obtaining a product of smooth, fine-grain consistency.

In accordance with the invention a scraper is slidably mounted in the cover-member of the tray, and the housewife, at twenty or thirty minute intervals, may open the door of the refrigerator and reciprocate the operating handle of the scraper several times without removing the tray from the freezing unit.

The invention is illustrated in a preferred embodiment in the accompanying drawings, in which—

Fig. 1 is a perspective view of the device inserted in the cooling unit of a refrigerator; Fig. 2, a broken longitudinal sectional view of the device, taken as indicated at line 2 of Fig. 3; Fig. 3, a transverse section, taken as indicated at line 3 of Fig. 2; Fig. 4, a top plan view of the scraper removed from the device; Fig. 5, a broken detail view of the lower side of the slide showing where the scraper attaches thereon; Fig. 6, a broken sectional view, taken as indicated at line 6 of Fig. 2; Fig. 7, a broken detail sectional view, taken as indicated at line 7 of Fig. 6; Fig. 8, a top plan view of the device with the slide-handle in section; Fig. 9, a plan view of the lower side of the cover-unit; Fig. 10, a plan view of the tray; Fig. 11, a broken sectional view of a modified form of cover-fastening; and Fig. 12, a similar view of modified form of fastening which may be used in connection with the one shown in Fig. 10.

In the embodiment illustrated, A designates a refrigerator-box having a freezing-unit A'; B, a tray adapted to be inserted into the unit A'; C, a cover-member for the tray B; and D, a slide adapted to fit into the cover B and equipped with a scraper or agitator D'.

The refrigerator A and freezing-unit A' may be of any suitable construction, and constitute no part of the present invention. The unit A' is provided, as well known in the art, with one or more freezing compartments adapted to receive the tray B.

The tray B is shown as an elongated container having a bottom-wall 10, and provided with integral side-walls 11 and end-walls 12 which are turned outward slightly to facilitate removal of the contents of the tray. The sidewalls are shown provided with suitable beads 11a, and the end-walls with projecting flanges or lips 12a which may serve as handles for withdrawing the tray from the unit A'. Small U-shaped brackets 13 are shown riveted to the end-walls of the tray, and are equipped with pivots 13a which carry spring-clips 14 for clamping the cover-member C in operative position. It will be understood that various other fastenings may be substituted if desired.

The cover-member C is shown with its central portion bellied upwardly and is provided at its front end portion with an opening 15 through which the slide D may move. The cover is provided with a flange 16 which is adapted to fit over the bead and lips of the tray B. A C-shaped longitudinal channel or guide-member 17 is riveted to the under side of the cover and its groove communicates with the opening 15 so as to receive the slide D. Stops 17a are provided at each end of the channel 17 to limit the travel of the slide when the scraper D' is attached.

The slide D may be in the form of a flat bar and is provided at its front end with a handle 20, which may be made of wood and attached by means of a rivet 20a. As shown in Fig. 5, one end of the slide is provided with a small recess 21 which is adapted to receive a boss on the scraper D'. A tapped hole 21a cooperates with a finger-screw 22 which holds the scraper in position.

The scraper or agitator D' comprises a top-member 23 having a central perforation 23a and boss 23b adapted to engage the recess 21 in the slide; and a U-shaped scraper-blade 24, attached to the top-member by means of cap-screws 24a. The scraper blade 24 follows the inner cross-section of the tray like a templet. The blade is of inverted V-shape cross section so as to lift the frozen contents away from the bottom and sidewalls when moved in either direction. The lower portion of the scraper blade is provided with inwardly projecting fingers 24b to break up the frozen lumps in the ingredients worked upon.

In the modification shown in Figs. 11 and 12, one end of the cover flange 25 is provided with a projection 25a, adapted to hook under one of the lips of a tray 26. The opposite end of the cover is provided with a spring-clip 27, which is adapted to snap under the lip at that end of the tray.

While the pan-like tray employed in each modification is elongated, it is not desired to unnecessarily limit the invention in this respect. The tray should be of uniform cross-section, permitting a full-length stroke of the scraper, whose bottom and upright members make sufficiently close contact with the bottom and side walls of the pan to destroy incipient crystallization, from time to time.

The device is made of sheet aluminum, preferably, and it will be noted that by unfastening the cover, and removing the finger screw 22, the parts can be quickly taken apart for cleaning.

It will be understood that it is not necessary for the scraper actually to bear against the walls of the tray to lift the frozen layer away from the tray walls and permit the unfrozen mixture to replace it. As mentioned above, the frozen layer is broken up by the fingers 24b, and it is believed that this action is superior to the method heretofore practiced of stirring the material with a spoon, as the latter action has a tendency to free minute air-bubbles which normally help to produce a light confection of fine texture.

It has been found that the agitator need only be oscillated five or six times during the freezing period, which may extend from two to five hours, to produce an excellent product. As the tray need not be removed from the unit and the operation is quickly accomplished, there is but little loss of refrigeration at the refrigerator door.

The foregoing detailed description has been given for clearness of understanding only, and no unnecessary limitations should be understood therefrom, but the appended claim should be construed as broadly as permissible, in view of the prior art.

What I regard as new and desire to secure by Letters Patent is:

In a freezer: an open-top pan having a removable cover-member, said cover-member being equipped on its under side with a C-shaped channel communicating with an opening in the front end of said cover-member; spring-clips on the front and rear of said pan adapted to snap over said cover-member and hold the same in position; a slide-bar reciprocably mounted in said channel and provided at its front end with a handle; and a scraper, having the form of a hollow templet conforming to the cross-section of said pan, detachably connected to the slide-bar by means of a thumb screw.

RALPH E. RAMSAY.